United States Patent
Garg et al.

(10) Patent No.: US 11,556,948 B2
(45) Date of Patent: Jan. 17, 2023

(54) METHOD AND SYSTEM FOR USING RECYCLING TO IMPROVE BLOCKCHAIN MINING

(71) Applicant: MASTERCARD INTERNATIONAL INCORPORATED, Purchase, NY (US)

(72) Inventors: Chandan Garg, Punjab (IN); Shubham Kumar, Haryana (IN); Abhinav Thukral, Delhi (IN); Madhavi Sharma, Haryana (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 176 days.

(21) Appl. No.: 16/290,331

(22) Filed: Mar. 1, 2019

(65) Prior Publication Data

US 2020/0279284 A1 Sep. 3, 2020

(51) Int. Cl.
*G06Q 30/02* (2012.01)
*G06Q 20/36* (2012.01)
*G06F 16/2458* (2019.01)

(52) U.S. Cl.
CPC ..... *G06Q 30/0208* (2013.01); *G06F 16/2465* (2019.01); *G06Q 20/36* (2013.01); *G06F 2216/03* (2013.01)

(58) Field of Classification Search
CPC ............... G06Q 30/0208; G06Q 20/36; G06F 16/2465; G06F 2216/03
See application file for complete search history.

(56) References Cited

U.S. PATENT DOCUMENTS

| | | | |
|---|---|---|---|
| 2009/0216593 A1* | 8/2009 | Gonen | G06Q 30/02 705/14.1 |
| 2015/0302364 A1* | 10/2015 | Calzada | G06Q 30/0261 705/14.58 |
| 2018/0337769 A1* | 11/2018 | Gleichauf | G06Q 20/065 |
| 2020/0082398 A1* | 3/2020 | Xu | H04L 9/3297 |

OTHER PUBLICATIONS

M. Blinder, "Making Cryptocurrency More Environmentally Sustainable", Nov. 27, 2018, Harvard Business Review. (Year: 2018).*
Empower _ Plastic Credits—Impactful solutions for your business (Year: 2018).*

* cited by examiner

*Primary Examiner* — Mario C. Iosif
(74) *Attorney, Agent, or Firm* — Panitch Schwarze Belisario & Nadel LLP

(57) ABSTRACT

A method for awarding blockchain mining fees based on recycling efforts includes: receiving recycling data for each of a plurality of mining systems including an amount of recycled materials associated with the respective mining system; receiving validation data for each mining system from third party entities including, for each mining system, a confirmation of the amount of recycled materials for the respective recycling data; selecting one of the mining systems, which is weighted based on the amount of recycled materials for the respective mining system compared to a total amount of recycled materials for all mining systems; and receiving a new block generated by the selected mining system including a block header and a plurality of blockchain data values including a blockchain data value corresponding to a blockchain transaction for payment of mining fees for the new block to a wallet associated with the selected mining system.

18 Claims, 5 Drawing Sheets

METHOD AND SYSTEM FOR USING RECYCLING TO IMPROVE BLOCKCHAIN MINING

FIELD

The present disclosure relates to improving the mining of blocks in a blockchain through recycling, specifically the use of recycling to weight the awarding of mining fees to miners in a blockchain network to encourage recycling to offset the electricity usage required for mining blocks.

BACKGROUND

Blockchains are typically managed and operated by a plurality of nodes in a decentralized network, where every node participants in the confirmation and distribution of blocks. For many blockchains, particularly larger blockchains with a large volume of data being confirmed and added, external computing systems participate in the blockchain as systems referred to as "miners." These mining systems perform complex calculations as part of the generation of new blocks, where the first mining system to come up with a suitable solution (e.g., finding a nonce that causes a hash of the new block to result in a value having a predetermined number of leading or ending zeroes) is awarded a fee for mining that block.

In an effort to increase the number of blocks successfully mined, and thus the number of fees collected, many mining systems use specialized hardware devices that are configured specifically for blockchain mining. However, these hardware devices often require significant amounts of electrical energy to operate, often far exceeding the amount of electrical energy used by standard computing devices and systems. In some geographical areas, the amount of electrical energy consumed by mining systems is substantial. In times where energy conservation is an important focus for many countries, and in fact the world as a whole, the significant usage of energy for blockchain mining may be discouraged or otherwise frowned upon.

However, mining is often essential for the successful and efficient operation and management of blockchains. Thus, there is a need for a solution to incentivize mining systems to improve their electrical energy usage or otherwise offset the amount of electrical energy used in mining.

SUMMARY

The present disclosure provides a description of systems and methods for awarding blockchain mining fees based on recycling efforts. Recycling that is performed by mining systems or entities associated therewith is tracked by both the mining system and a third party for verification. The recycling performed by or on behalf of the mining system is quantified, along with the recycling efforts by all other mining systems participating in the blockchain. When a new block is to be mined, one of the mining systems may be randomly or pseudo-randomly selected with weighting applied to the mining systems based on the attributed recycling efforts, such that a mining system that is responsible for more recycling will have a greater chance at receiving the mining fee, thus encouraging the mining systems to offset their electrical energy usage with conservation efforts or else risk significant expense with little-to-no return. In some cases, miners may be able to bid on the mining fees, where bidding power may correspond to their recycling efforts, as opposed to purely random or pseudo-random selection.

A method for awarding blockchain mining fees based on recycling efforts includes: receiving, by a receiver of a processing server, recycling data for each of a plurality of mining systems, where the recycling data includes at least an amount of recycled materials and an identifier associated with the respective mining system; receiving, by the receiver of the processing server, validation data for each of the plurality of mining systems, where the validation data is received from one or more third party entities and includes, for each of the plurality of mining systems, a confirmation of the amount of recycled materials included in the recycling data for the respective mining system; selecting, by a processing device of the processing server, one of the plurality of mining systems, where the selection is weighted based on the amount of recycled materials for the respective mining system compared to a total amount of recycled materials for all of the plurality of mining systems; and receiving, by the receiver of the processing server, a new block generated by the selected one of the plurality of mining systems, where the new block includes at least a block header and a plurality of blockchain data values including at least one blockchain data value corresponding to a blockchain transaction for payment of mining fees for the new block to a wallet associated with the selected one of the plurality of mining systems.

A system for awarding blockchain mining fees based on recycling efforts includes: a receiver of a processing server configured to receive recycling data for each of a plurality of mining systems, where the recycling data includes at least an amount of recycled materials and an identifier associated with the respective mining system, and receive validation data for each of the plurality of mining systems, where the validation data is received from one or more third party entities and includes, for each of the plurality of mining systems, a confirmation of the amount of recycled materials included in the recycling data for the respective mining system; and a processing device of the processing server configured to select one of the plurality of mining systems, where the selection is weighted based on the amount of recycled materials for the respective mining system compared to a total amount of recycled materials for all of the plurality of mining systems, wherein the receiver of the processing server is further configured to receive a new block generated by the selected one of the plurality of mining systems, where the new block includes at least a block header and a plurality of blockchain data values including at least one blockchain data value corresponding to a blockchain transaction for payment of mining fees for the new block to a wallet associated with the selected one of the plurality of mining systems.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as storage of land ownership or voting records, a cryptographic currency and other types of valuable digital information. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Awarding Blockchain Mining Fees Based on Recycling Efforts

Figure 1:
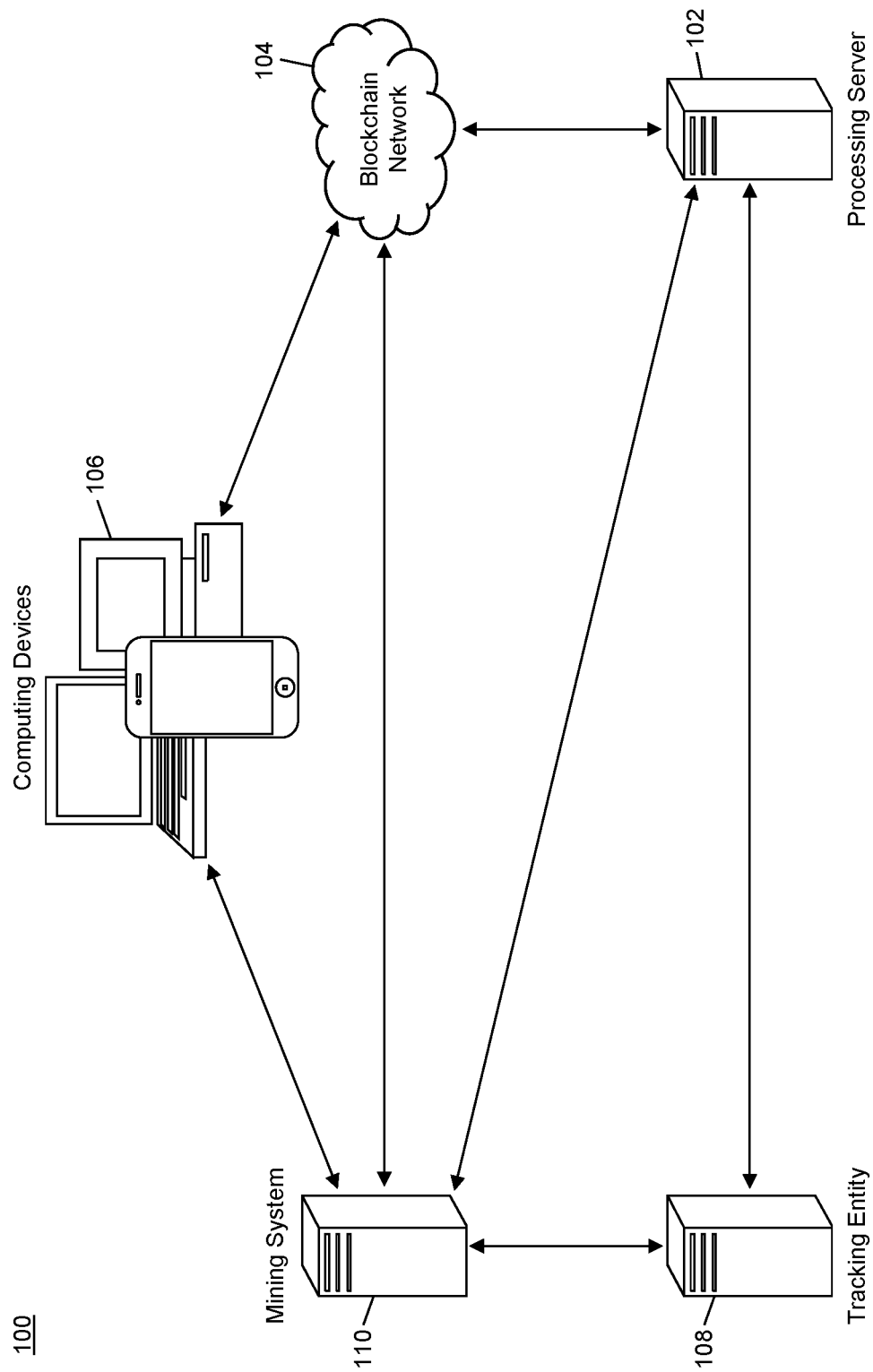
FIG. 1 is a block diagram illustrating a high level system architecture for awarding blockchain mining fees based on recycling efforts in accordance with exemplary embodiments.

FIG. 1 illustrates a system 100 for the awarding of blockchain mining fees as part of the operation of a blockchain based on recycling efforts by or attributed to one of a plurality of mining systems participating in the confirmation and perpetuation of the blockchain.

The system 100 may include a processing server 102. The processing server 102, discussed in more detail below, may be configured to operate as part of a blockchain network 104. The processing server 102 may be specially configured to award blockchain mining fees to one of a plurality of mining systems 110 that participates in the blockchain associated with the blockchain network 104 based on the recycling efforts performed by, on behalf of, or otherwise attributed to the respective mining system 100.

The blockchain network 104 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some cases, each mining system 110 may be a node. In some instances, mining systems 110 may perform mining functions, discussed in more detail below, but may not otherwise be a node in the blockchain network 104. In some embodiments, the processing server 102 may be a node in the blockchain network 104. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device 106 that stores the private key for use thereof in blockchain transactions. For instance, each computing device 106 may each have their own private key for respective cryptographic key pairs, and may each be a blockchain wallet for use in transactions with the blockchain associated with the blockchain network 104. Computing devices 106 may be any type of computing device 106 suitable to store and utilize a blockchain wallet, such as a desktop computer, laptop computer, notebook computer, tablet computer, cellular phone, smart phone, smart watch, smart television, wearable computing device, implantable computing device, etc.

In other embodiments, the blockchain may be used to store any other type of data in an immutable format. For instance, a blockchain may be used to track ownership of land deeds, where changes in ownership may be recorded as direct transfers (e.g., similar to transfers of currency) or where changes may be stored as data. In another example, a blockchain may be used for voting, where votes may be attributed to blockchain wallets and counted accordingly. Other uses for a blockchain for data storage will be apparent to persons having skill in the relevant art.

Each blockchain data value stored in the blockchain may correspond to a blockchain transaction or other storage of data, as applicable. A blockchain transaction may consist of at least: a digital signature of the sender of currency that is generated using the sender's private key, a blockchain address of the recipient of currency generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the processing of a blockchain transaction, such data may be provided to a node in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), and then include the blockchain transaction in a new block. The new block may be validated by other nodes in the blockchain network 104 before being added to the blockchain and distributed to all of the nodes in the blockchain network 104. In cases where a blockchain data value may not be related to a blockchain transaction, but instead the storage of other types of data, blockchain data values may still include or otherwise involve the validation of a digital signature.

In the system 100, mining systems 110 may participate in the blockchain via the confirmation of blockchain data values and generation and confirmation of new blocks, commonly referred to as "mining." A mining system 110 may receive new blockchain data values to be added to the blockchain from computing devices 106, may confirm the blockchain data values (e.g., validate digital signatures using public keys, check unspent transaction output ownership, check for sufficient currency for a transfer, etc.) and may generate a new block including the generation of the block reference value and data reference value. In some cases, mining may further include the selection of a nonce where a hash of the new block, a hash of the new block header (e.g., for a subsequent block reference value), or data reference value (e.g., if the nonce is included as a blockchain data value) has a predetermined trait, such as a predetermined number of leading or ending zeroes.

In traditional blockchains, the first mining system that successfully mines a new block (e.g., generates the completed block including the correct nonce for fulfillment of the predetermined trait) will receive a mining fee for mining the new block. In such instances, the mining fee is often awarded via the inclusion of an additional blockchain transaction in the new block or a subsequent block, which transfers the mining fee to a blockchain wallet associated with the mining system 110. In cases where the blockchain is not used for the transfer of cryptographic currency, alternative methods may be used for the awarding of mining fees, such as payment via cryptographic currency on a different blockchain, payment of fiat currency through traditional methods, etc.

In the system 100, mining fees may be awarded based on the recycling efforts of mining systems 110. Each mining system 110 may be responsible for performing recycling, either directly by the mining system 110, via an entity that owns or operates the mining system, or through actions performed thereby. For instance, the mining system 110 or an entity associated therewith may fund recycling efforts by another entity, may partner with another entity that performs recycling, etc. In some cases, rules regarding what may be considered recycling for the methods and systems discussed herein may be set by the blockchain network 104 or processing server 102.

Each mining system 110 may keep track of the recycling performed by or on behalf of the mining system 110. The mining system 110 may electronically transmit recycling data regarding the tracked recycling to the processing server 102 using a suitable communication network and method. In some cases, the recycling data may be transmitted at predetermined intervals (e.g., hourly, daily, weekly, monthly, per new block, etc.). In other cases, the recycling data may be transmitted at-will by the mining system 110, such as any time the mining system 110 wants its recycling efforts updated. In an exemplary embodiment, the system 100 may include a tracking entity 108. The tracking entity 108 may be a third party entity that is not owned or associated directly with a mining system 110 that may be used to confirm or validate the recycling performed by a mining system 110. For instance, the tracking entity 108 may be a non-profit organization that monitors recycling efforts that can validate the amount of recycling performed by or on behalf of a mining system 110. In some instances, a tracking entity 108 may be a group of mining systems 110 that must reach consensus on the recycling efforts of one of the mining systems 110 in the group, where each mining system 110 thereby validates the recycling efforts of competing mining systems 110.

In the system 100, tracking entities 108 may provide validation data to the processing server 102 for validation of recycling data provided by mining systems 110. In some cases, the processing server 102 may transmit recycling data to tracking entities 108, which may attempt to validate the recycling data and return a confirmation or lack thereof to the processing server 102, indicating if the mining system's stated recycling efforts are correct or incorrect. In some cases, the tracking entity 108 may provide its own measurement regarding the recycling associated with a mining system 110, which may be accepted by the processing server 102 as the proper value attributed to the mining system 110.

Recycling may be quantified in any suitable manner, which may be set by the blockchain network 104, processing server 102, or other entity, such as a regulatory agency associated with a jurisdiction where the mining systems 110 or the blockchain network 104 are located. For instance, recycling may be measured based on a weight of recycled material, an aggregated amount based on various weights of various recycled materials that may be weighted based on the material being recycled (e.g., glass may be worth more per kilogram than plastic for the sake of the system 100), a reduction in carbon emissions, other method used to measure conservation efforts such as converting organic material into energy or mulch, recycling electronic components or their constituent parts (wire, electrodes, capturing hazardous materials, etc.), or a combination thereof. In some cases, raw recycling data may be provided to the processing server 102, where the processing server 102 may use predetermined algorithms to identify a quantified value for each of the mining systems 110. For example, a mining system 110 may provide raw weights of recycled amounts of plastic, glass, paper, and cardboard, where the mining system 110 may use an algorithm to calculate a single value used to represent the recycling performed by the mining system 110. For instance, in an example, a first mining system 110 may recycle fifty kilograms each of the four materials and a second mining system 110 may recycle fifty kilograms of paper, glass, and cardboard and one hundred kilograms of plastic. In such an example, the processing server 102 may generate a value of 250 for the first mining system 110 and 350 for the second mining system 110 (e.g., one point for each of the paper, glass, and cardboard, and double points for plastic). In another such example, the processing server 102 may generate a value of 42 for the first mining system 110 and a value of 58 for the second mining system 110 (e.g., based on proportions with a maximum value of 100).

When a blockchain mining fee is to be awarded, the processing server 102 may select one of the mining systems 110. In one embodiment, the selection may be random or pseudo-random based on weighting of each of the mining systems 110, where the weighting is based on the recycling amount attributed to the respective mining system 110. For instance, in the above example, the random selection may have a 42% chance of selecting the first mining system 110 and a 58% chance of selecting the second mining system 110. In another embodiment, the mining systems 110 may be eligible to bid on the mining fee, either directly or through weighting. For instance, in the former case, each mining system 110 may be able to use their points in a bid for the mining fee, where unused points may be retained for future bids, where the highest bidder wins the mining fee. In the latter case, a mining system 110 may use their points to increase their weighting for the random or pseudo-random selection.

When a mining system 110 is selected by the processing server 102, the mining fee for that block may be awarded to that mining system 110. In such cases, the mining system 110 may be required to perform the mining for that block. In some such cases, complex calculations for generation of the new block (e.g., identification of a nonce with a predetermined trait) may be reduced due to the selection of a mining system 110. For example, there may be no need for a complex calculation to create a "race" between mining systems 110 when the winning mining system 110 is selected through recycling efforts. In other cases, the mining fee may be awarded to the selected mining system 110 even if the block is mined by a separate mining system 110. In such cases, additional recycling points may be awarded to mining systems 110 that successfully mine blocks without fee attribution.

In some embodiments, mining fees may be awarded directly by the processing server 102. For instance, the processing server 102 may generate a new blockchain data value for inclusion in the block to be mined or a subsequent block for payment of the mining fee to the selected mining system 110. In other embodiments, the selected mining system 110 may include the mining fee using traditional methods, as there may be no competition for the completed block due to the selection.

The methods and systems discussed herein encourage mining systems 110 to participate, either directly or indirectly, in recycling in an effort to offset the electrical energy used in mining new blocks in the blockchain network 104. By awarding mining fees based on recycling efforts, mining systems 110 are encouraged to increase their recycling as failure to do so may result in the expending of electrical energy without any returns, leading to a financial loss. Mining systems 110 that perform a sufficient amount of recycling may continue to see profit from mining, where their sufficient amount of recycling may offset the electrical energy used in the mining, thereby reducing the overall negative impact of blockchain mining for the operation and maintenance of the blockchain. Thus, the methods and systems discussed herein can improve conservation efforts for the environment, while maintaining efficient operation of a blockchain, through the improved management of mining systems 110 in the blockchain network 104.

Processing Server

Figure 2:
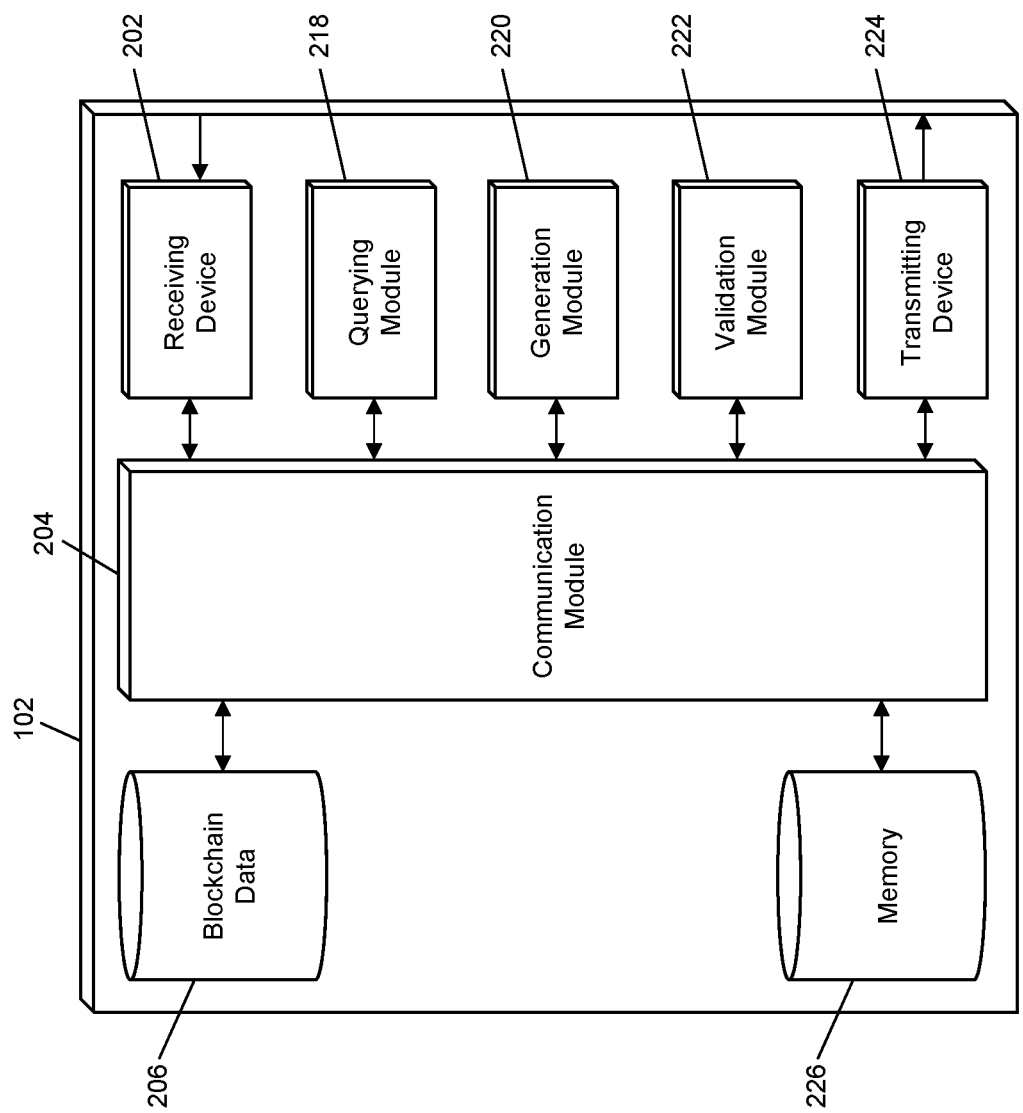
FIG. 2 is a block diagram illustrating the processing server of the system of FIG. 1 for the awarding of blockchain mining fees based on recycling efforts in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102. In some cases, each node in the blockchain network 104 and mining system 110 in the system 100 may be configured similar to the processing server 102 in FIG. 2 or computer system 500 in FIG. 5, such as including the components illustrated therein.

The processing server 102 may include a receiving device 202. The receiving device 202 may be configured to receive data over one or more networks via one or more network protocols. In some instances, the receiving device 202 may be configured to receive data from blockchain networks 104, tracking entities 108, mining systems 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by tracking entities 108 and mining systems 110 that are superimposed or otherwise encoded with recycling data and/or validation data related to recycling efforts performed by or on behalf of mining systems 110. The receiving device 202 may also be configured to receive data signals electronically transmitted by mining systems 110 that are superimposed or otherwise encoded with bidding information regarding bids for mining fees related to recycling efforts associated with the respective mining system 110. In embodiments where the processing server 102 is a node in the blockchain network 104, the receiving device 202 may receive data signals electronically transmitted by other nodes that are superimposed or otherwise encoded with new blocks for confirmation and/or addition to the blockchain.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include blockchain data 206. The blockchain data 206 may be comprised of a plurality of blocks, where each block includes a block header and one or more blockchain data values. Each block header may include at least a timestamp, block reference value, and data reference value. In some embodiments, a block header may also include a nonce such that a hash of the block header may have a predefined trait. In some cases, the blockchain data values included in each block may include one blockchain data value corresponding to the awarding of a mining fee to the mining system 110 responsible for mining the respective block.

The processing server 102 may include a querying module 218. The querying module 218 may be configured to execute queries on databases to identify information. The querying module 218 may receive one or more data values or query strings, and may execute a query string based thereon on an indicated database, such as a memory 226 of the processing server 102 to identify information stored therein. The querying module 218 may then output the identified information to an appropriate engine or module of the processing server 102 as necessary. The querying module 218 may, for example, execute a query on the memory 226 of the processing server 102 to identify the recycling data for each of a plurality of mining systems 110 for identifying weighting for use in selecting a mining system 110 for the awarding of a mining fee.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to select a mining system 110 from a plurality of mining systems 110 through random or pseudo-random selection based on weighting. In some cases, the generation module 220 may be configured to generate a winner based on bidding, either through direct bidding or weight-based bidding of mining systems 110. The generation module 220 may also be configured to generate quantified recycling values for mining systems 110 based on validated recycling data associated therewith.

The processing server 102 may also include a validation module 222. The validation module 222 may be configured to perform validations and verifications for the processing server 102 as part of the functions discussed herein. The validation module 222 may receive instructions as input, which may include data to be validated and/or data to be used in the validation. The validation module 222 may perform a validation or verification as requested, and may output a result of the validation to another module or engine of the processing server 102. The validation module 222 may, for example, be configured to validate recycling data received from mining systems 110 using validation data received from tracking entities 108.

The processing server 102 may also include a transmitting device 224. The transmitting device 224 may be configured to transmit data over one or more networks via one or more network protocols. In some instances, the transmitting device 224 may be configured to transmit data to blockchain networks 104, tracking entities 108, mining systems 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to tracking entities 108 that are superimposed or otherwise encoded with requests for validation data or requests to validate recycling data provided by a mining system 110. The transmitting device 224 may also be configured to electronically transmit data signals to mining systems 110 that are superimposed or otherwise encoded with requests for recycling data, bid requests, recycling validation information and notifications, mining award notifications, and other data as discussed herein. In embodiments where the processing server 102 is a node in the blockchain network 104, the transmitting device 224 may be configured to electronically transmit data signals to other nodes in the blockchain network 104 that are superimposed or otherwise encoded with new blocks for confirmation and addition to the blockchain.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, additional blockchain data, hashing algorithms for generating blocks, credentials for validation, usage rule templates, communication data for blockchain nodes, communication data for tracking entities 108 and mining systems 110, signature generation and verification algorithms, address generation algorithms, recycling data, validation data, algorithms for determining recycling quantification amounts, bid amounts, weighting algorithms, etc.

Process for Awarding of Mining Fees

Figure 3:
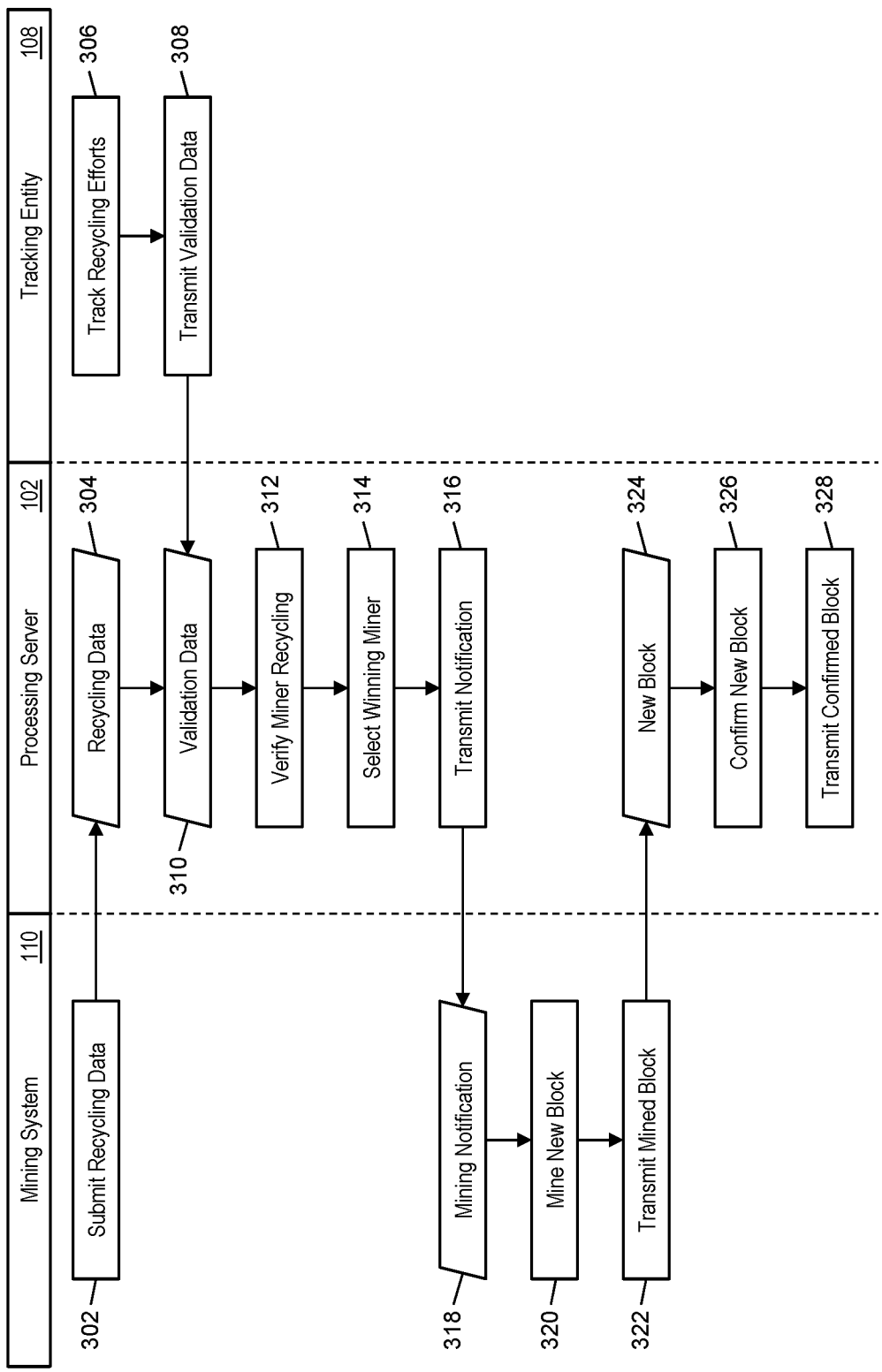
FIG. 3 is a flow diagram illustrating a process for awarding blockchain mining fees based on recycling efforts in the system of FIG. 1 in accordance with exemplary embodiments.

FIG. 3 illustrates an example process in the system 100 of FIG. 1 for the awarding of mining fees to one of a plurality of mining systems 110 based on the recycling efforts of the mining system 110 through random or pseudo-random selection and weighting.

In step 302, each of the plurality of mining systems 110 may electronically transmit their recycling data to the processing server 102 using a suitable communication network and method. The recycling data may include information regarding at least an amount of recycled materials attributed to the respective mining system 110. In step 304, the receiving device 202 of the processing server 102 may receive the recycling data from the mining systems 110. In step 306, one or more tracking entities 108 may track the recycling efforts by each of the plurality of mining systems 110 and/or entities associated therewith. In step 308, the tracking entities 108 may electronically transmit validation data to the processing server 102 using a suitable communication network and method. The validation data may include the recycling data for each of the mining systems 110 as collected by the respective tracking entity 108. In step 310, the receiving device 202 of the processing server 102 may receive the validation data.

In step 312, the validation module 222 of the processing server 102 may validate the recycling data provided by each of the plurality of mining systems 110. Validation of the recycling data may include checking the recycling data submitted by the respective mining system 110 with the validation data related to that mining system 110 received from the tracking entities 108. In some cases, if there is a discrepancy in the values, the value included in the validation data may be honored in place of the value in the recycling data. In other cases, the processing server 102 may contact the mining system 110 and/or tracking entity 108 to resolve the dispute.

In step 314, the generation module 220 of the processing server 102 may generate a random or pseudo-random selection of one of the plurality of mining systems 110, where the selection is weighted based on the amount of recycled materials validated for each of the plurality of mining systems 110. For example, mining systems A, B, and C may have 200, 300, and 500 kilograms of recycled materials attributed thereto, respectively. The selection of a mining system 110 may be weighted such that mining system A has a 20% chance of being selected, mining system B has a 30% chance of being selected, and mining system C has a 50% chance of being selected. Any suitable method for weighting the selection according to recycling amounts may be used (e.g., the weights may be 30%, 31%, and 38%, respectively, for instance).

In step 316, the transmitting device 224 of the processing server 102 may electronically transmit a notification to the selected mining system 110 informing the mining system 110 that they were selected to mine the next block in the blockchain. In step 318, the selected mining system 110 may receive the notification from the processing server 102. In some embodiments, the mining fee may be set by the processing server 102 or blockchain network 104 and included in the notification. In other embodiments, the mining fee may be based on the next block to be mined, such as using traditional methods.

In step 320, the selected mining system 110 may mine the next block in the blockchain using traditional methods and systems. In step 322, the selected mining system 110 may electronically transmit the mined block to the processing server 102, where the mined block may include a blockchain transaction for payment of the mining fee to a blockchain wallet associated with the selected mining system 110. In step 324, the receiving device 202 of the processing server 102 may receive the new, mined block. In step 326, the validation module 222 may confirm the new block using traditional methods and systems for confirmation of a block in a blockchain. In step 328, the transmitting device 224 of the processing server 102 may transmit the confirmed block to other nodes in the blockchain network 104 for perpetuation across the entire blockchain.

Exemplary Method for Awarding Blockchain Mining Fees Based on Recycling

Figure 4:
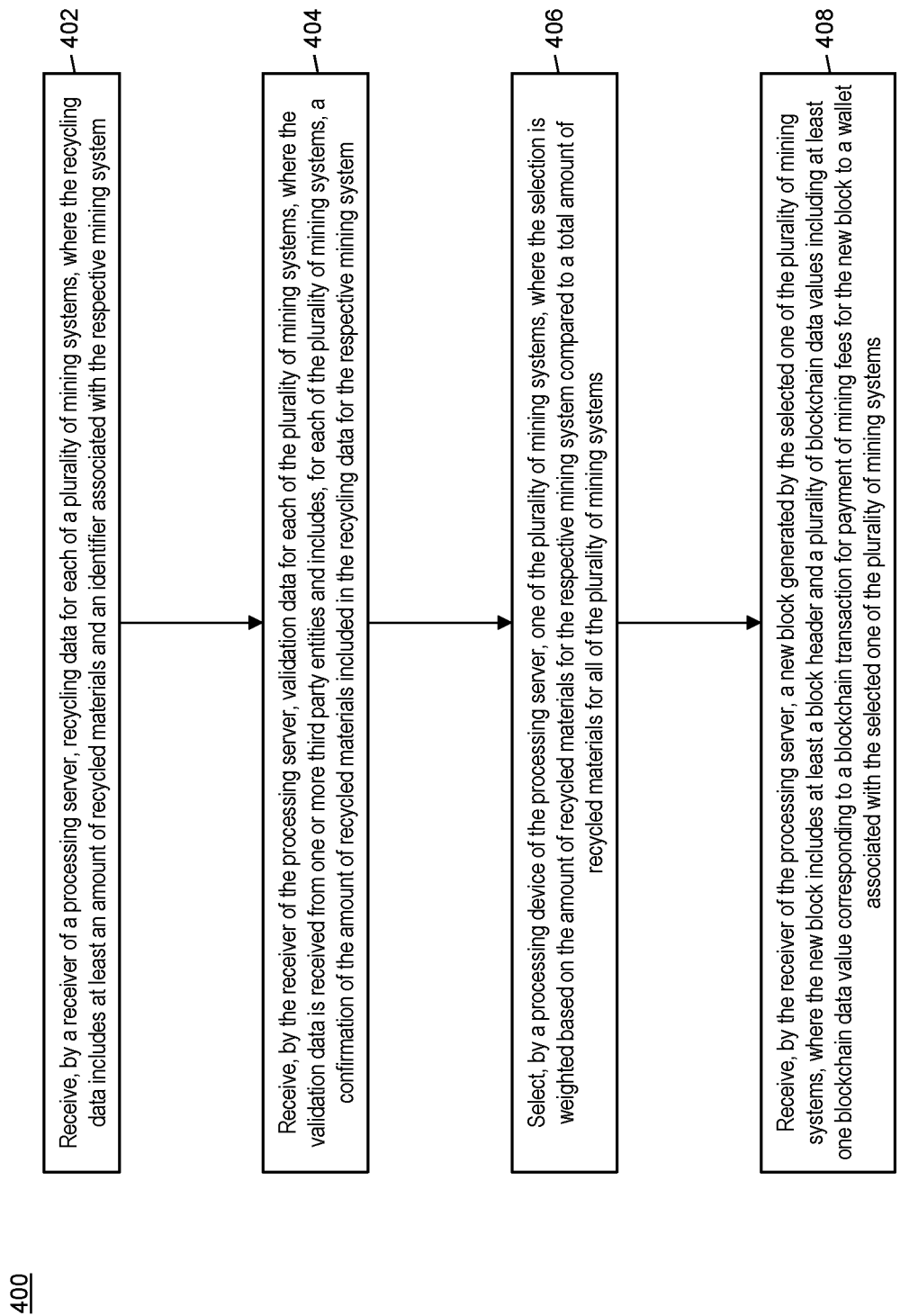
FIG. 4 is a flow chart illustrating an exemplary method for awarding blockchain mining fees based on recycling efforts in accordance with exemplary embodiments.

FIG. 4 illustrates a method 400 for the awarding of mining fees for the mining of a new block in a blockchain to a mining system based on a weighted selection, where the weighting is based on recycling efforts attributed to each of the included mining systems.

In step 402, recycling data for each of a plurality of mining systems (e.g., mining systems 110) may be received by a receiver (e.g., the receiving device 202) of a processing server (e.g., the processing server 102), where the recycling data includes at least an amount of recycled materials and an identifier associated with the respective mining system. In step 404, validation data may be received by the receiver of the processing server for each of the plurality of mining systems, where the validation data is received from one or more third party entities (e.g., tracking entities 108) and includes, for each of the plurality of mining systems, a confirmation of the amount of recycled materials included in the recycling data for the respective mining system.

In step 406, one of the plurality of mining systems may be selected by a processing device (e.g., the generation module 220) of the processing server, where the selection is weighted based on the amount of recycled materials for the respective mining system compared to a total amount of recycled materials for all of the plurality of mining systems. In step 408, a new block generated by the selected one of the plurality of mining systems may be received by the receiver of the processing server, where the new block includes at least a block header and a plurality of blockchain data values including at least one blockchain data value corresponding to a blockchain transaction for payment of mining fees for the new block to a wallet associated with the selected one of the plurality of mining systems.

In one embodiment, the method 400 may further include: confirming, by the processing device (e.g., the validation module 222) of the processing server, the received new block; and transmitting, by a transmitter (e.g., the transmitting device 224) of the processing server, the received new block to a plurality of nodes in a blockchain network (e.g., the blockchain network 104). In a further embodiment, the processing server may be a node in the blockchain network. In some embodiments, the selection may be random or pseudo-random based on the weighting.

In one embodiment, the method 400 may also include receiving, by the receiver of the processing server, a bid amount for each of the plurality of mining systems, where the bid amount is less than or equal to the amount of recycled materials for the respective mining system, wherein the selection is further weighted based on the bid amount for the respective mining system. In a further embodiment, the bid amount may be included in the recycling data for the respective mining system.

In some embodiments, the method 400 may further include: storing, in a memory (e.g., the memory 226) of the processing server, the plurality of blockchain data values not including the at least one blockchain data value; generating, by the processing device (e.g., the generation module 220) of the processing server, the at least one blockchain data value based on a fee amount included in each of the stored plurality of blockchain data values; and transmitting, by a transmitter (e.g., the transmitting device 224) of the processing server, the generated at least one blockchain data value to the selected one of the plurality of mining systems prior to receiving the new block. In one embodiment, the recycling data received for each of the plurality of mining systems is received from the respective mining system.

Computer System Architecture

Figure 5:
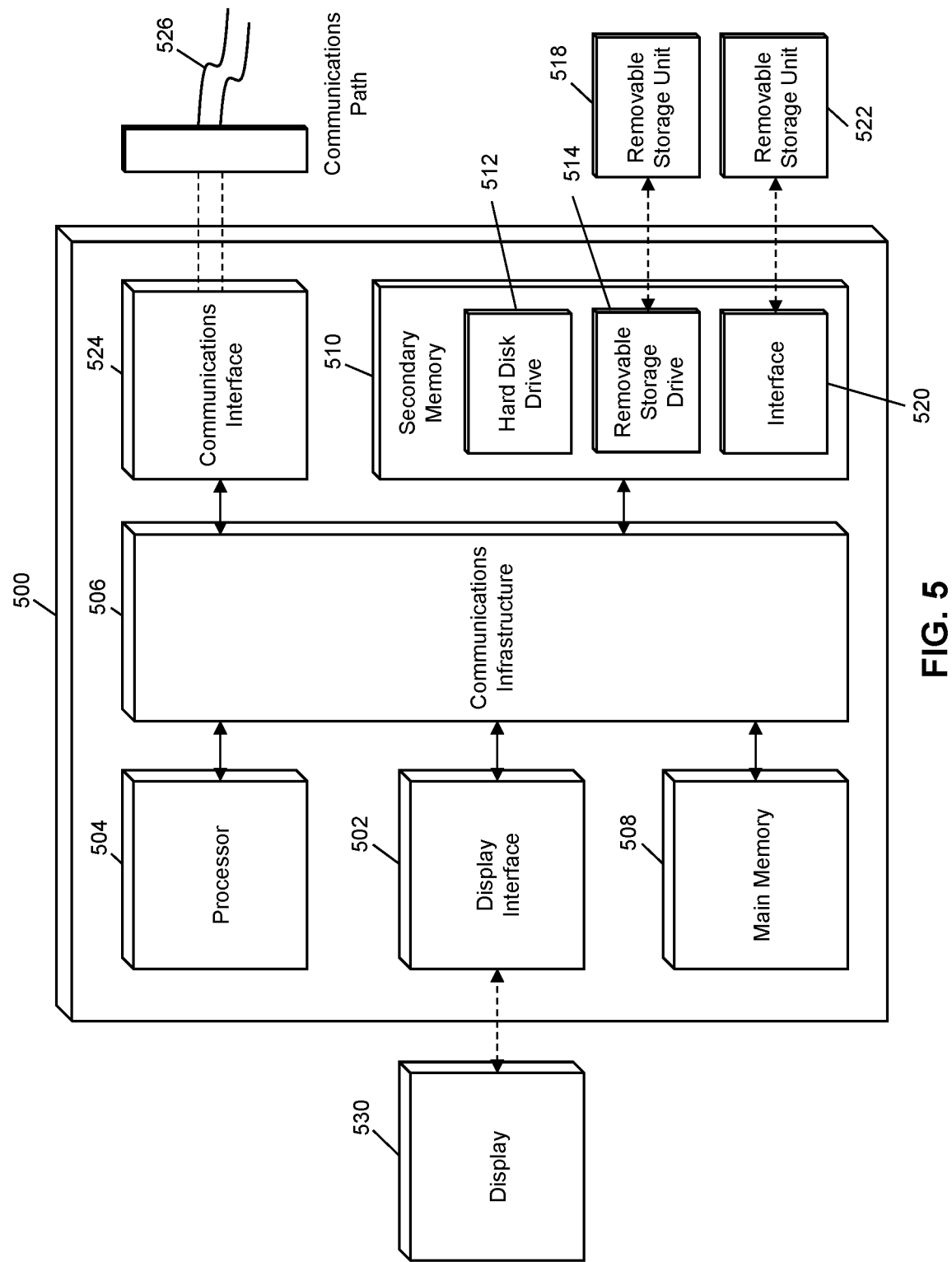
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 102 and mining system 110 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for awarding blockchain mining fees based on recycling efforts. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for awarding blockchain mining fees based on recycling efforts, comprising:

receiving, by a receiver of a processing server, recycling data for each of a plurality of mining systems, where the recycling data includes at least an amount of materials recycled by each of the plurality of mining systems and an identifier associated with the respective mining system, the amount of recycled materials corresponding to an offset amount of electrical energy use;

receiving, by the receiver of the processing server, validation data for each of the plurality of mining systems, where the validation data is received from one or more third party entities and includes, for each of the plurality of mining systems, a confirmation of the amount of recycled materials included in the recycling data for the respective mining system;

awarding, by the processing device of the processing server, one or more points to each of the plurality of mining systems based on the respective amount of recycled materials associated with each of the plurality of mining systems;

receiving, by the receiver of the processing server, a bid amount for each of the plurality of mining systems, where the bid amount is based on the respective awarded amount of one or more points awarded to each of the plurality of mining systems;

selecting, by a processing device of the processing server, one of the plurality of mining systems to mine one or more blockchain transactions, where the selection is weighted based on the amount of recycled materials for the respective mining system compared to a total amount of recycled materials for all of the plurality of mining systems and the respective bid amount for the respective mining system, wherein the higher the amount of the one or more points in the bid amount of each of the plurality of mining systems increases the likelihood of selection of the respective mining system; and receiving, by the receiver of the processing server, a new block generated by the selected one of the plurality of mining systems, where the new block includes at least a block header and a plurality of blockchain data values including at least one blockchain data value corresponding to a blockchain transaction for payment of mining fees for the new block to a wallet associated with the selected one of the plurality of mining systems.

2. The method of claim 1, further comprising:
confirming, by the processing device of the processing server, the received new block; and
transmitting, by a transmitter of the processing server, the received new block to a plurality of nodes in a blockchain network.

3. The method of claim 2, wherein the processing server is a node in the blockchain network.

4. The method of claim 1, wherein the selection is based on a proportion of the amount of recycled materials for the respective mining system compared to a total amount of recycled materials for all of the plurality of mining systems.

5. The method of claim 1, wherein the bid amount is included in the recycling data for the respective mining system.

6. The method of claim 1, wherein the bid amount received for at least one of the plurality of mining systems is based on less than the respective awarded amount of points awarded to the at least one of the plurality of mining systems.

7. The method of claim 1, further comprising:
storing, in a memory of the processing server, the plurality of blockchain data values not including the at least one blockchain data value;
generating, by the processing device of the processing server, the at least one blockchain data value based on a fee amount included in each of the stored plurality of blockchain data values; and
transmitting, by a transmitter of the processing server, the generated at least one blockchain data value to the selected one of the plurality of mining systems prior to receiving the new block.

8. The method of claim 1, wherein the recycling data received for each of the plurality of mining systems is received from the respective mining system.

9. The method of claim 1, including:
calculating, by the processing device of the processing server, a value for each of the plurality of mining systems, the value being a weighed value based on a type and a weight of the recycled materials recycled by each of the plurality of mining systems; and
wherein the selection is further based on the calculated value of each of the plurality of mining systems.

10. A system for awarding blockchain mining fees based on recycling efforts, comprising:
a receiver of a processing server configured to receive recycling data for each of a plurality of mining systems, where the recycling data includes at least an amount of materials recycled by each of the plurality of mining systems and an identifier associated with the respective mining system, the amount of recycled materials corresponding to an offset amount of electrical energy use;

the receiver of the processing device configured to receive validation data for each of the plurality of mining systems, where the validation data is received from one or more third party entities and includes, for each of the plurality of mining systems, a confirmation of the amount of recycled materials included in the recycling data for the respective mining system;

a processing device of the processing server configured to award one or more points to each of the plurality of mining systems based on the respective amount of recycled materials associated with each of the plurality of mining systems;

the receiver of the processing server configured to receive a bid amount for each of the plurality of mining systems, where the bid amount is based on the respective awarded amount of one or more points awarded to each of the plurality of mining systems;

the processing device of the processing server configured to select one of the plurality of mining systems, where the selection is weighted based on the amount of recycled materials for the respective mining system compared to a total amount of recycled materials for all of the plurality of mining systems and the respective bid amount for the respective mining system, wherein the higher the amount of the one or more points in the bid amount of each of the plurality of mining systems increases the likelihood of selection of the respective mining system; and the receiver of the processing server is further configured to receive a new block generated by the selected one of the plurality of mining systems, where the new block includes at least a block header and a plurality of blockchain data values including at least one blockchain data value corresponding to a blockchain transaction for payment of mining fees for the new block to a wallet associated with the selected one of the plurality of mining systems.

11. The system of claim 10, further comprising:
a transmitter of the processing server, wherein
the processing device of the processing server is further configured to confirm the received new block, and
the transmitter of the processing server is configured to transmit the received new block to a plurality of nodes in a blockchain network.

12. The system of claim 11, wherein the processing server is a node in the blockchain network.

13. The system of claim 10, wherein the selection is based on a proportion of the amount of recycled materials for the respective mining system compared to a total amount of recycled materials for all of the plurality of mining systems.

14. The system of claim 10, wherein the bid amount is included in the recycling data for the respective mining system.

15. The system of claim 10, wherein the bid amount received for at least one of the plurality of mining systems is based on less than the respective awarded amount of points awarded to the at least one of the plurality of mining systems.

16. The system of claim 10, further comprising:
a transmitter of the processing server; and
a memory of the processing server configured to store the plurality of blockchain data values not including the at least one blockchain data value, wherein
the processing device of the processing server is further configured to generate the at least one blockchain data value based on a fee amount included in each of the stored plurality of blockchain data values, and the transmitter of the processing server is configured to transmit the generated at least one blockchain data value to the selected one of the plurality of mining systems prior to receiving the new block.

17. The system of claim 10, wherein the recycling data received for each of the plurality of mining systems is received from the respective mining system.

18. The system of claim 10, including:

the processing device of the processing server configured to calculate a value for each of the plurality of mining systems, the value being a weighed value based on a type and a weight the recycled materials recycled by each of the plurality of mining systems; and wherein the selection is further based on the calculated value of each of the plurality of mining systems.

\* \* \* \* \*